(12) United States Patent
Gunkel et al.

(10) Patent No.: US 9,175,602 B2
(45) Date of Patent: Nov. 3, 2015

(54) V ENGINE

(75) Inventors: Rolf Gunkel, Friedrichshafen (DE);
Felix Henssler, Constance (DE);
Johannes Hiry, Tettnang (DE); Jörg Andre Reitz, Salem (DE); Martin Wiedmann, Constance (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 328 days.

(21) Appl. No.: 13/508,536

(22) PCT Filed: Nov. 4, 2010

(86) PCT No.: PCT/EP2010/006719
§ 371 (c)(1),
(2), (4) Date: Jun. 26, 2012

(87) PCT Pub. No.: WO2011/054513
PCT Pub. Date: May 12, 2011

(65) Prior Publication Data
US 2012/0255299 A1    Oct. 11, 2012

(30) Foreign Application Priority Data

Nov. 6, 2009  (DE) .......................... 10 2009 052 209

(51) Int. Cl.
| F02B 33/44 | (2006.01) |
| F02B 67/10 | (2006.01) |
| F02B 29/04 | (2006.01) |
| F02B 37/013 | (2006.01) |
| F02B 75/22 | (2006.01) |

(52) U.S. Cl.
CPC ............ *F02B 67/10* (2013.01); *F02B 29/0412* (2013.01); *F02B 29/0475* (2013.01); *F02B 37/013* (2013.01); *F02B 75/22* (2013.01); *Y02T 10/144* (2013.01); *Y02T 10/146* (2013.01)

(58) Field of Classification Search
CPC .. F02B 37/007; F02B 37/013; F02B 29/0412; Y02T 10/144; Y02T 10/121; Y02T 10/47; F02M 25/0707; F02M 25/0711; F02M 25/0726
USPC ............... 60/612, 605.2; 123/562, 568.2, 563
See application file for complete search history.

(56) References Cited

U.S. PATENT DOCUMENTS

| 3,027,706 | A | | 4/1962 | Sprick | |
| 3,976,041 | A | | 8/1976 | Mettig et al. | |
| 4,214,443 | A | | 7/1980 | Herenius | |
| 4,299,090 | A | * | 11/1981 | Deutschmann | ................. 60/612 |
| 4,400,945 | A | * | 8/1983 | Deutschmann et al. | ........ 60/612 |
| 5,440,881 | A | * | 8/1995 | Sudmanns et al. | .............. 60/612 |
| 7,461,627 | B2 | * | 12/2008 | Liu et al. | ...................... 60/605.2 |

FOREIGN PATENT DOCUMENTS

| AT | 2539 U1 | 12/1998 |
| DE | 3005655 A1 | 8/1981 |

(Continued)

*Primary Examiner* — Thomas Denion
*Assistant Examiner* — Thomas Olszewski
(74) *Attorney, Agent, or Firm* — Fishman Stewart Yamaguchi PLLC

(57) ABSTRACT

The invention relates to a V engine, especially a diesel engine, comprising a first cylinder bank and a second cylinder bank, said V engine being designed for two-stage charging by means of a low-pressure exhaust gas turbocharger and a high-pressure exhaust gas turbocharger. The invention is characterized in that the low-pressure exhaust gas turbocharger and the high-pressure exhaust gas turbocharger are respectively arranged on the front of a cylinder bank above a main output element of the V engine.

9 Claims, 4 Drawing Sheets

(56) References Cited

FOREIGN PATENT DOCUMENTS

| | | |
|---|---|---|
| DE | 154904 A1 | 4/1982 |
| DE | 3633405 A1 | 4/1988 |
| DE | 4017823 A1 | 12/1991 |
| DE | 19529991 C1 | 10/1996 |
| EP | 0952329 A2 | 10/1999 |
| EP | 1998022 A2 | 12/2008 |
| EP | 2058485 A1 | 5/2009 |
| FR | 2917124 A1 | 12/2008 |
| GB | 437078 A | 10/1935 |

* cited by examiner

V ENGINE

CROSS-REFERENCE TO RELATED APPLICATIONS

This application claims priority to German Patent Application 10 2009 052 209.3 filed on Nov. 6, 2009 and PCT/EP2010/006719 filed on Nov. 4, 2010, which are hereby incorporated by reference in their entireties.

TECHNICAL FIELD

The present disclosure relates to a V engine.

BACKGROUND

Forced induction for internal combustion engines, including high performance internal combustion engines, is known in the prior art, wherein the forced induction is carried out by means of mechanical superchargers or exhaust stream turbochargers. Such engines are, for example, diesel engines, such as ship power plant engines or industrial engines, for example, having an output in the range of several hundred kW, for example. In this case, forced induction systems with one exhaust stream turbocharger per block of cylinders are known, as in EP 0 952 329 A2, for example, as are forced induction systems having multi-stage charging, with multiple turbochargers per cylinder bank, for example.

In addition, in the field of such high-performance internal combustion engines, stricter exhaust regulations will require compliance in the future. In order to meet emission specifications and/or requirements, including for example the EPA TIER 4 rule for emissions, an internal combustion engine of the type presently considered must be designed in accordance with the rules using emission-reducing technologies, for example. Typically, such technologies require significant constructed space.

Proceeding from the above situation, the problem addressed by the invention is that of suggesting a low-emission engine, particularly an engine in the output range above 500 kW, which overcomes the disadvantages named above, and which enables an extremely compact construction, particularly by means of the arrangement of the forced induction system.

SUMMARY

According to the disclosure, a V engine is suggested, particularly a diesel engine, having a first and a second cylinder bank, wherein the V engine is designed for two-stage forced induction by means of a low-pressure exhaust stream turbocharger, as well as a high-pressure exhaust stream turbocharger, wherein one low-pressure exhaust stream turbocharger and one high-pressure exhaust stream turbocharger are arranged on the end face of each of the two cylinder banks above a primary output element of the V engine.

In one embodiment, the V engine has a low-pressure compressor in each of a first and a second charge air line, for the purpose of directing a charge air stream, a charge air cooler, and a high-pressure compressor, wherein one low-pressure compressor is arranged in each low-pressure exhaust stream turbocharger, and one high-pressure compressor is arranged in each high-pressure exhaust stream turbocharger, and wherein the first and the second charge air streams are merged at a primary charge air cooler, wherein one charge air stream is directed downstream from the primary charge air cooler to each of the first and second cylinder banks, and wherein the configuration includes one exhaust gas return per cylinder bank, and each exhaust gas return has one exhaust gas return cooler. By means of this exhaust gas return, cooled exhaust gas of each cylinder bank can be inserted into the charge air stream to the same cylinder bank downstream from the primary charge air cooler.

In a further embodiment, the V engine has one exhaust gas return cooler arranged above a cylinder head on each cylinder bank.

In a further embodiment of the V engine, an intermediate charge air cooler is provided on each cylinder bank, and is arranged in each case between the exhaust gas return cooler situated on the cylinder bank and the low-pressure and high-pressure exhaust stream turbochargers arranged on the end face of the cylinder banks.

In addition, in one embodiment of the V engine, a primary charge air cooler is arranged between the exhaust gas return coolers arranged above one cylinder head on each cylinder bank, and is particularly arranged between the flanks of the V-shape of the V engine.

According to a further embodiment of the V engine, exhaust gas from each cylinder bank, particularly cooled exhaust gas, is injected by means of a mixer element into a charge air stream downstream from the primary charge air cooler.

According to the disclosure, a V engine is suggested wherein the mixer element is arranged on an end face of the primary charge air cooler which faces away from the primary output element.

In one aspect of the V engine, the exhaust gas return coolers and/or the high-pressure exhaust stream turbochargers and/or the low-pressure exhaust stream turbochargers and/or the primary charge air coolers and/or the intermediate charge air coolers are arranged symmetrically about a center axis A of the V engine.

In one embodiment of the V engine, the low-pressure exhaust stream turbocharger and the high-pressure exhaust stream turbocharger are arranged on a power output side of the V engine.

In a further embodiment of the V engine, the low-pressure compressors of the first and the second low-pressure exhaust stream turbocharger are connected by a vacuum housing arranged between the same.

According to a further embodiment of the V engine, one low-pressure exhaust stream turbocharger is connected in series with one high-pressure exhaust stream turbocharger and arranged on each cylinder bank, particularly on an end face thereof.

Additional features and advantages of the disclosure are found in the description of embodiments of the disclosure given below, with reference to the illustrated figures showing essential aspects of the disclosure, and in the claims. The individual features can be incorporated individually or in any and all combinations to realize a variant of the disclosure.

Preferred embodiments of the invention are described in greater detail below with reference to the attached illustrations, wherein:

DETAILED DESCRIPTION

In the following description, elements having the same or comparable functions are indicated by identical reference numbers.

Figure 1:
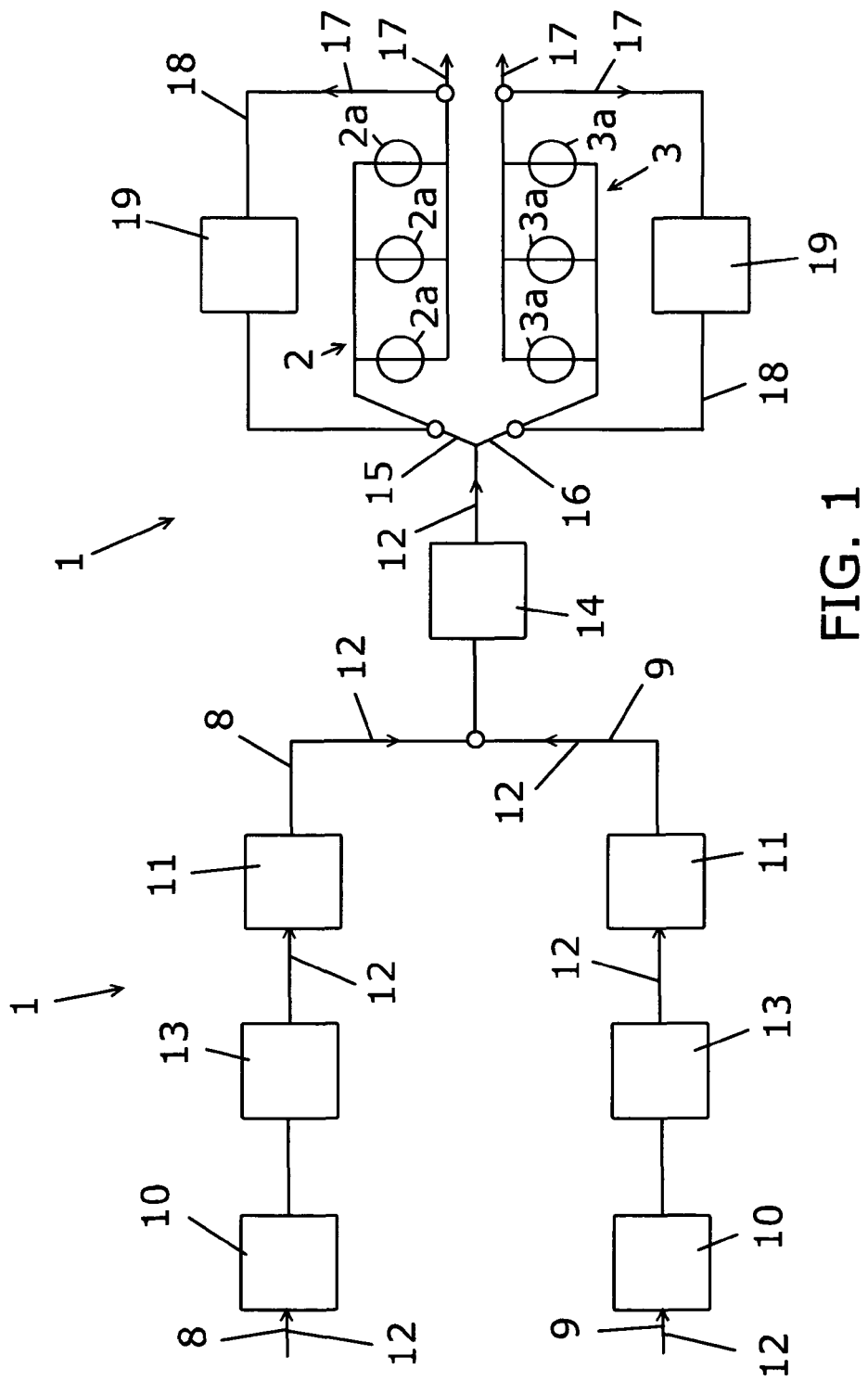
FIG. 1 shows an exemplary charge air- and exhaust stream flow diagram in a V engine according to one possible embodiment of the disclosure.
Figure 2:
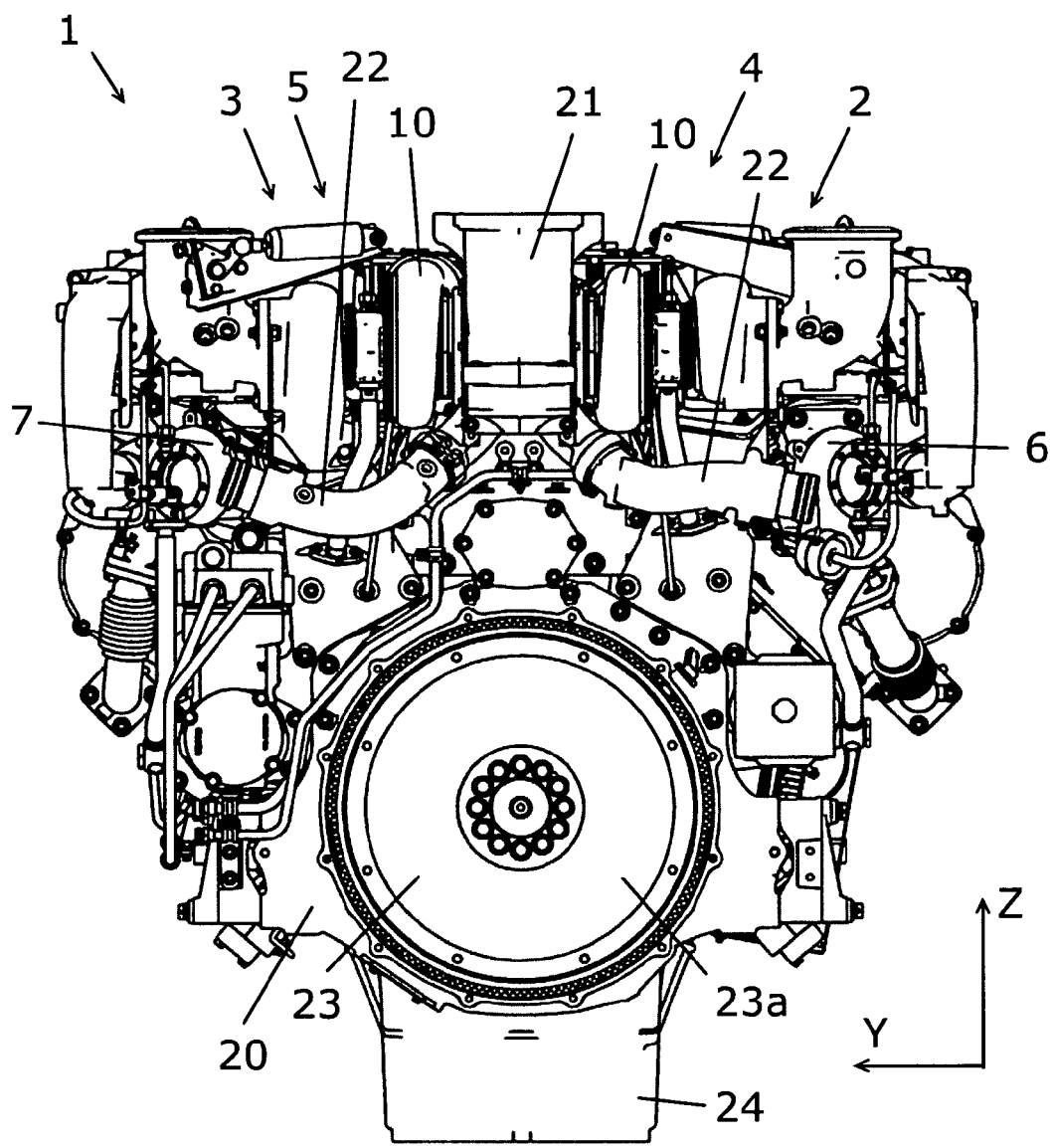
FIG. 2 shows an exemplary illustration of the V engine in a frontal view, according to one possible embodiment of the disclosure.
Figure 3:
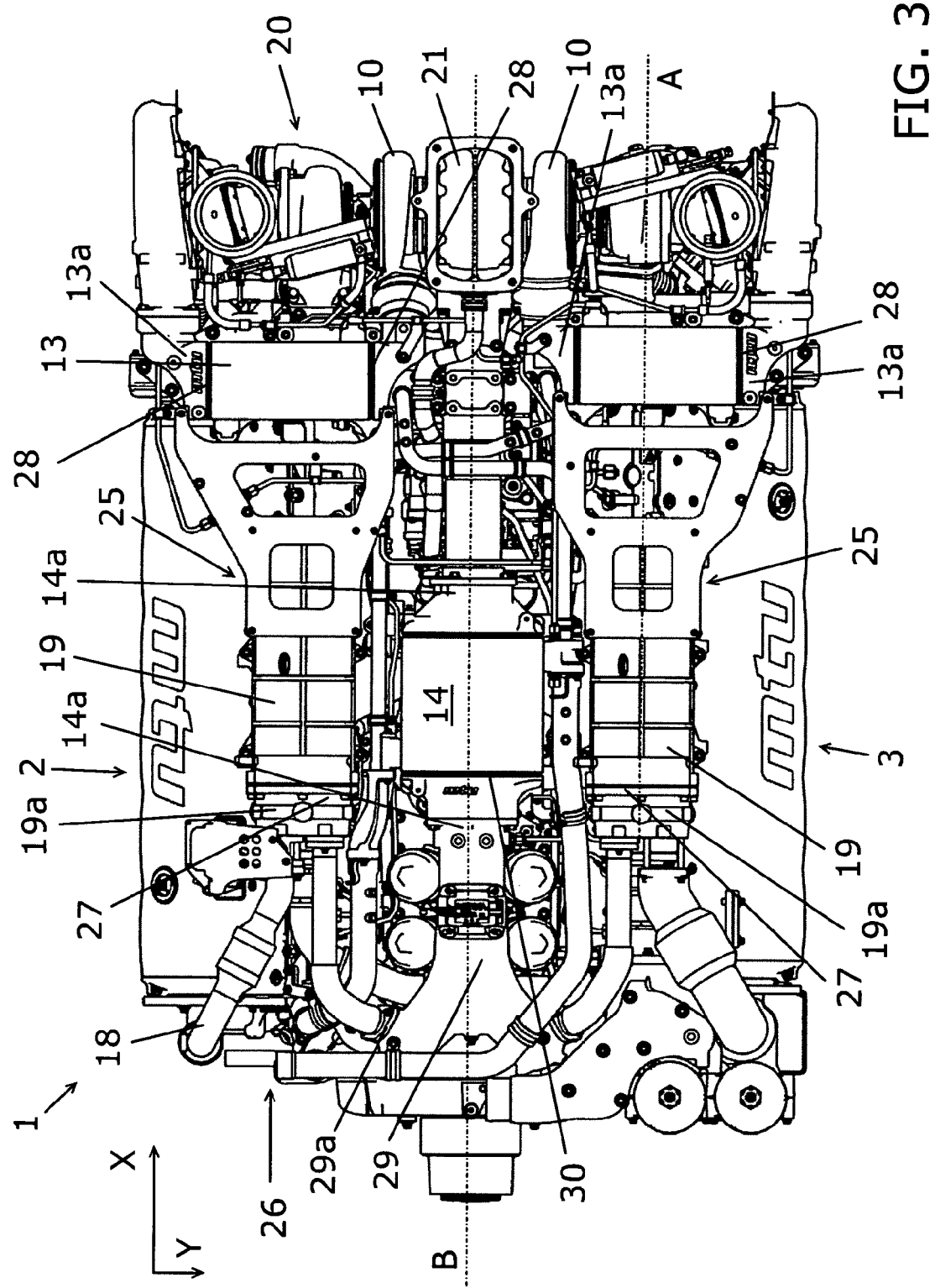
FIG. 3 shows an exemplary illustration of the V engine in FIG. 2 in a top view.

In order to enable a compact constructed shape of an internal combustion engine, a V engine 1 is provided (for example as in FIG. 1, 2). Compared to an inline motor, for example, the V engine 1 generally has a shorter length and is suitable for realizing a compact constructed shape. In the known manner, the V engine 1, which is a diesel engine or a gasoline engine, for example, has a first 2 and a second 3 cylinder bank, wherein the cylinder banks can assume an angle of the V which theoretically lies anywhere from 1 to 180 degrees, and for example is a V angle of 90 degrees. The V engine 1, for example an engine with a high output above 500 kW, has an arrangement which is used to increased performance, and particularly to increase performance in a controllable manner, by means of forced induction (charging). Particularly, a two-stage charger is included, for example a regulated two-stage charger, wherein, by way of example, an exhaust stream is first directed at each of two first high-pressure exhaust stream turbochargers, for example, and then to the low-pressure exhaust stream turbochargers, for example. The regulation thereof in this case can be carried out via a conventional bypass, for example.

According to the disclosure, the V engine 1 is turbocharged in two stages by means of a first 4 and a second 5 low-pressure exhaust stream turbocharger, as well as by means of a first 6 and a second 7 high-pressure exhaust stream turbocharger. To this end, by way of example, the first low-pressure exhaust stream turbocharger 4 and the first high-pressure exhaust stream turbocharger 6 are arranged on the first cylinder bank 2, and the second low-pressure exhaust stream turbocharger 5 and the second high-pressure exhaust stream turbocharger 7 are arranged on the second cylinder bank 3, in such a manner that initially two charge air lines 8 and/or 9 are formed, and the same can be merged downstream to create a single charge air line. The first exhaust stream turbochargers 4, 6, and the second exhaust stream turbochargers 5, 7 in this case are each driven solely by the exhaust stream of the cylinder bank 2, 3 to which they are functionally assigned, for example, and are each driven by means of the turbine wheels thereof arranged in the exhaust stream thereof, for example.

A low-pressure compressor 10 in each of the low-pressure exhaust gas turbochargers 4 and 5 can be driven in the known manner my means of such a turbine wheel, as can a high-pressure compressor 11 in each of the high-pressure exhaust stream turbochargers 6, 7.

According to the disclosure, one low-pressure exhaust stream turbocharger 4, 5 is connected in series to one high-pressure exhaust stream turbocharger 6, 7 on each of the cylinder banks 2, 3 as part of the two-stage turbocharging configuration, meaning that an exhaust stream proceeds from the respective cylinder bank 2, 3, for example, and initially flows through the high-pressure exhaust stream turbocharger 6 and/or 7, for example, driving the same, to then flow to the low-pressure exhaust stream turbocharger 4 and/or 5, driving the same. As such, in each case, one high-pressure exhaust stream turbocharger 6 and/or 7 and one low-pressure exhaust stream turbocharger 4 and/or 5 are connected in series as regards their (driven) turbines and/or the incoming flow thereof; i.e. they are connected in a drive series.

For the purpose of complying with strict exhaust gas regulations, for example, including EPA TIER 4 *i* or EPA TIER 4 final, for example, the V engine 1 has, as part of the included two-stage, and particularly regulated, turbocharger system, an exhaust gas return system in addition to the exhaust stream turbochargers 4, 5, 6, 7, for example, wherein said exhaust gas return system has an exhaust gas return cooler, an intermediate charge air cooler, and a primary charge air cooler. An exemplary arrangement, of such a system in conjunction with the (engine) turbocharging is described below, with reference to FIG. 1.

The V engine 1 has, as indicated above, a first 8 and a second 9 charge air (line) section, each of which is included in the configuration for the purpose of directing the charge air 12 in the direction of (the combustion chambers of) a cylinder bank 2, 3. Components for cooling and compressing the charge air 12 are arranged in each of the charge air line sections 8, 9. In the present case, each charge air section 8 and 9 has a low-pressure compressor 10 on the inlet and/or intake side thereof, for example a low-pressure exhaust stream turbocharger 4 and/or 5 for each. The charge air pre-compressed by means of a low-pressure compressor 10 is supplied to an intermediate charge air cooler 13 arranged downstream (with respect to the flow direction toward a cylinder bank 2, 3), and is further compressed and/or densified by means of a high-pressure compressor 11, for example a high-pressure exhaust stream turbocharger 6 and/or 7, in each section.

The charge air 12 of the first 8 and the second 9 charge air lines, having been compressed in this manner, is merged and cooled again by means of a primary charge air cooler 14 arranged downstream. The cooling by means of the intermediate charge air cooler 13 and the primary charge air cooler 14 achieves a low- and/or reduced nitric oxide combustion by reducing the combustion temperature in a combustion chamber.

The charge air 12 cooled by means of the primary charge air cooler 14 is divided downstream of the primary charge air cooler 14 into a first 15 and a second 16 (partial) charge air stream, each of which is directed to a cylinder bank 2, 3 (each having, for example, 3 or more cylinders 2*a* and/or 3*a*) for use in the combustion. The exhaust gas 17 created in each of the cylinder banks 2, 3 as part of the combustion process is directed, by means of an exhaust gas return system 18, into the fractional first 15 and/or second 16 (partial) charge air streams, for example, wherein the latter connect with the primary charge air cooler 14 downstream of the same, for the purpose of adjusting the combustion temperature to achieve a low-emission combustion, for example. A configuration can also be contemplated wherein the exhaust gas 17 is directed into a unified charge air stream prior to the separation into partial charge air streams.

The exhaust gas returns 18 are each designed as a bypass, for example, and each have one, and for example exactly one, exhaust gas return cooler 19 for the purpose of reducing the exhaust gas temperature, thereby also reducing the combustion temperature as a result of the exhaust gas, the same having being cooled as such, being introduced into the first or second charge air stream 15 and/or 16, whereby the ejection of nitric oxide can also be further reduced. The exhaust gas return cooler 19 is a known exhaust gas return cooler, for example, having a stainless steel cooling element, for example, which provides cooling by means of cooling water, for example.

To make it possible to implement the V engine 1 with the intended compact dimensions, the low-pressure exhaust stream turbochargers 4 and 5, as well as the high-pressure exhaust stream turbochargers 6 and 7 are arranged on the end faces of the cylinder banks 2, 3 of the V engine 1, particularly each on the end faces of the cylinder banks 2, 3 on the same side of the V engine 1, and particularly on the power output side 20, for example, where a primary output element 23 is arranged. In this case, the term 'end face' indicates an outer end of the V engine 1 and/or of the cylinder bank 2, 3 in the direction of the neighboring cylinders (2a, 3a) of one cylinder bank 2 and/or 3 (in the x-dimension).

In this case, the arrangement is implemented in such a manner, for example, that one low-pressure exhaust stream turbocharger 4 and/or 5 is arranged together with one high-pressure exhaust stream turbocharger 6 and/or 7 on the end face of each of the cylinder banks 2 and/or 3. In each case, one low-pressure exhaust stream turbocharger 4 and/or 5 is arranged in series with one high-pressure exhaust stream turbocharger 6 and/or 7, for example.

In this configuration, one low-pressure exhaust stream turbocharger 4 and/or 5 and one high-pressure exhaust stream turbocharger 6 and/or 7 are arranged on each cylinder bank 2, 3, in each case on the upper end of the V engine 1, for example, and at the height of the cylinder heads 25, for example, along with further components for the turbocharging, for example, including an intake and/or charge air inlet housing 21, wherein the latter can be arranged between the low-pressure compressors 10 of the first 4 and the second 5 low-pressure exhaust stream turbochargers, conduits and/or connector pipes 22, pressure cartridges, etc.

The low-pressure exhaust stream turbochargers 4, 5 as well as the high-pressure exhaust stream turbochargers 6, 7 in this case are particularly arranged above the primary output element 23, wherein the same can consists of a flywheel 23a of the V engine 1, for example. This means that the exhaust stream turbochargers [4, 5, 6, 7] are arranged above the primary output element 23 with respect to the direction proceeding from an oil pan 24 towards the cylinder head 25 (the z-dimension). The term 'primary output element 23' in this case indicates the element which is provided for the purpose of transmitting the majority of the engine energy to an element being driven (a shaft, flywheel, etc.). By means of such an arrangement, components arranged on the side 26 opposite the output (the fan side), including the oil filter, fuel filter, etc., for example, remain accessible, thereby increasing the ease of servicing of the engine.

In addition, for the purpose of realizing the compact dimensions of the V engine 1, an exhaust gas return cooler 19, and for example exactly one exhaust gas return cooler 19 at each position, is included in the configuration above one cylinder head 25 of each cylinder bank 2, 3. The exhaust gas return coolers 19 are particularly each arranged in such a manner that an installation space is formed and/or created between an end of an exhaust gas return cooler 19, wherein said end faces the exhaust stream turbochargers 4, 6 and/or 5, 7, and the exhaust stream turbochargers 4, 6 and/or 5, 7 themselves, and this installation space enables the accommodation and/or arrangement of an intermediate charge air cooler 13. As such, an intermediate charge air cooler 13 is arranged on and/or above (in the z-dimension) each cylinder bank 2, 3 between an exhaust gas return cooler 19 and a high-pressure and low-pressure exhaust stream turbocharger 4, 6 and 5, 7, for example between the same in the direction from the output side 20 to its opposite side (in the x-dimension).

According to the disclosure, in one configuration, particularly intended for the purpose of achieving a compactly constructed, space-saving arrangement of the pipes, wherein the same are used for directing the charge air, for example, the exhaust gas return coolers 19 are each arranged with the longitudinal axis A thereof oriented along the x-dimension, in such a manner that connectors 19a for the exhaust stream delivery and/or exhaust stream discharge are arranged in the direction pointing toward the output side of the engine and/or the opposite side, and preferably the direction pointing toward the opposite side, for example, and are each also arranged on an end face 27, for example, of the exhaust gas return cooler 19. In addition, in this configuration, and for the same purpose, the intermediate charge air coolers 13 are each, for example, arranged in such a manner that each connector 13a for a high-pressure and/or low-pressure compressor 11 and/or 10, the same being arranged on an end face 28, for example, is displaced by 90 degrees with respect to the x- and z-dimensions (aligned with the y-dimension).

In addition, for the purpose of realizing an extremely compact and low-emission V engine 1, a primary charge air cooler 14, particularly exactly one primary charge air cooler 14, for example, is arranged between the first 2 and the second 3 cylinder bank, for example between the flanks of the V in the V-shape formed by the cylinder banks 2, 3. The primary charge air cooler 14 is particularly arranged between the exhaust gas return coolers 19 of the first and the second cylinder bank, meaning between the same 19 along the imaginary line extending from the first cylinder bank 2 to the second cylinder bank 3 (the y-dimension). Also for the purpose of achieving a compact engine arrangement of the V engine 1, charge air inlets and outlets 14a of the primary charge air cooler 14 are likewise arranged in the x-dimension, for example, such that air can flow to the primary charge air cooler 14 from the engine output side 20, for example, and the charge air is removed in the direction opposite the engine output 26, for example. As such, conduit elements for the routing of charge air can likewise be arranged between the cylinder banks 2, 3 and therefore incorporated into an arrangement with a small constructed space.

According to the disclosure, for the purpose of mixing or adding to the exhaust gas returned by means of each of the exhaust gas returns 18, using the charge air stream 12 and/or 15, 16, and/or mixing/adding thereto (using up to 60% of the total exhaust gas, for example), a mixer element is included downstream of the primary charge air cooler 14, for example, in the form of a mixer housing 29, for example, and exactly one mixer housing 29, for example. Such a mixer housing 29 allows the regulated dosing and/or mixing of the exhaust gas 17 to/with the compressed charge air. The mixer housing 29 is arranged on a side facing away from the exhaust stream turbochargers, 4, 5, 6, 7, for example, the same being an end face 30 (on the side opposite the engine output), for example, of the primary charge air cooler 14, and likewise between the flanks of the V-shape, for example, of the first 2 and the second 3 cylinder banks, for example. The mixer housing 29 is also intended, for example, to divide the charge air stream 12 merged at the primary charge air cooler 14 to form both the first 15 and the second 16 charge air streams for the two cylinder banks 2, 3. The mixer housing 29 is arranged in such a manner, for example, that the connectors 29a thereof which serve to take in and/or discharge the charge air are oriented substantially along the x-dimension, wherein the connectors for the discharge of the charge air are oriented in the direction facing opposite the engine output side, for example.

Figure 4:
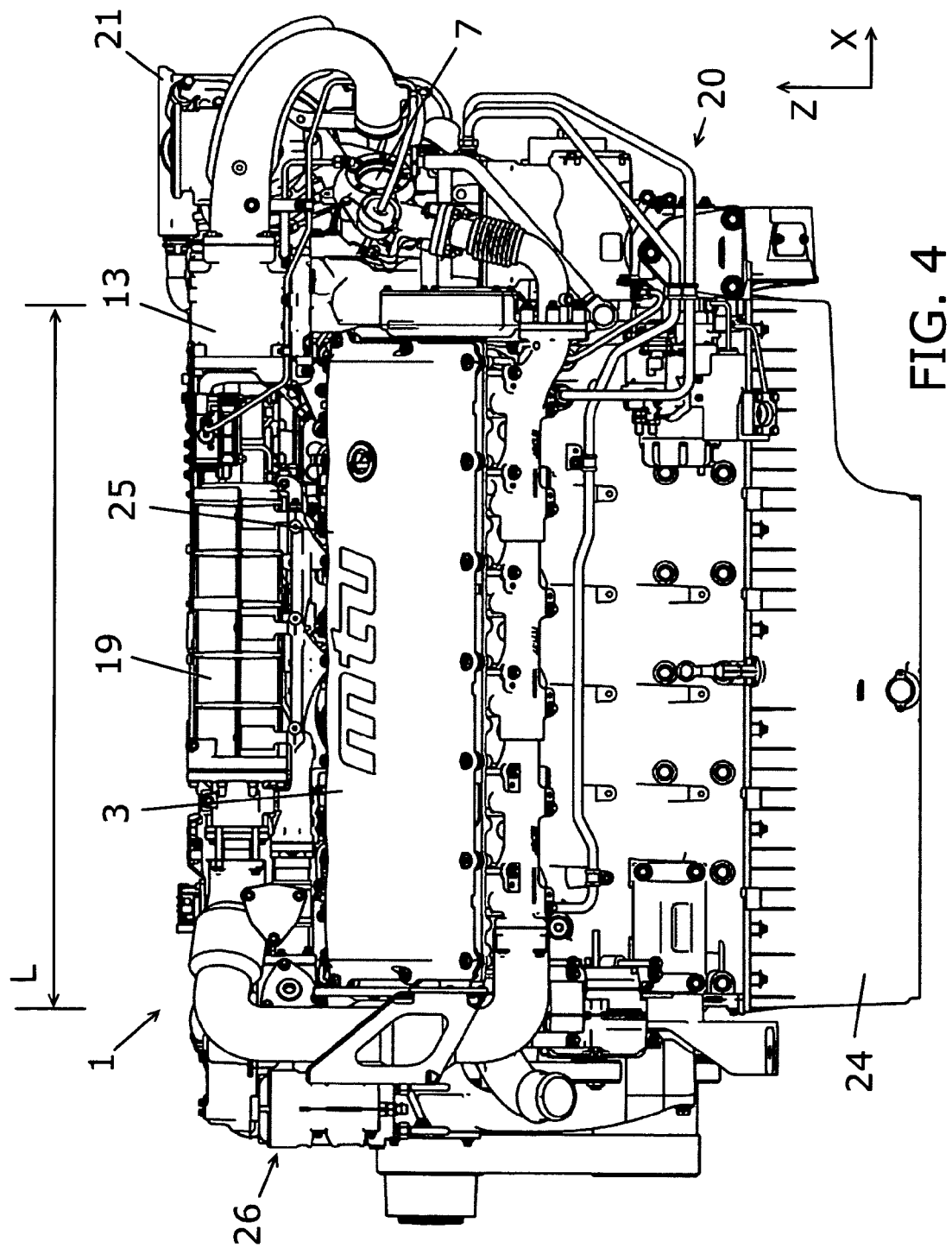
FIG. 4 shows an exemplary illustration of the V engine in FIG. 2 in a side view.

With the arrangement of the components included for the forced induction and/or for the purpose of reducing emissions, it is possible to realize an extremely compact V engine 1. For example, it is possible to realize a construction wherein the ratio of the engine length in the x-dimension, with the exhaust stream turbochargers 4, 5, 6, 7, to the length of the engine block L itself is smaller than a factor of 1.4 (FIG. 4). In this case, the arrangement of the exhaust stream turbochargers 4, 5, 6, 7 and/or the exhaust gas return coolers 19 and/or the intermediate charge air coolers 13 and/or the primary charge air coolers 14 is also symmetric to a center axis B of the V engine 1, as seen in the x-dimension. In the configuration, pairs of exhaust gas return coolers 19, intermediate charge air coolers 13, and/or exhaust stream turbochargers 4, 5 and/or 6, 7 are situated opposite each other along the B axis, for example.

With the arrangement of the exhaust stream turbochargers 4, 5, 6, 7 on the end face of the cylinder banks 2, 3 and above the primary output element 23 of the V engine 1, it is possible to prevent a compromise to the functionality and accessibility of the primary output element 23, as long as the primary output element 23 and the exhaust stream turbochargers 4, 5, 6, 7 do not overlap each other in the y-dimension and in the z-dimension.

The invention claimed is:

1. A V diesel engine, comprising:
   a first and a second cylinder bank;
   a two-stage forced induction from first and second low-pressure exhaust stream turbochargers and a high-pressure exhaust stream turbocharger;
   exhaust gas return systems;
   intermediate charge air coolers; and
   a primary charge air cooler;
   wherein the first and second low-pressure exhaust stream turbochargers and the high-pressure exhaust stream turbocharger are arranged on the end face of each of two cylinder banks above a primary output element of the V diesel engine;
   wherein low-pressure compressors of the first and the second low-pressure exhaust stream turbochargers are connected to an intake housing arranged between the same;
   wherein each of the exhaust gas return systems has an exhaust gas return cooler arranged above each of the first and second cylinder banks, wherein a longitudinal axis of each exhaust gas return cooler is oriented such that a connector of the exhaust gas return cooler is positioned between the exhaust gas return cooler and one of the primary output member and a side of the V diesel engine opposite the primary output member, the connector configured to supply exhaust gas to or discharge exhaust gas from the exhaust gas return cooler;
   wherein each of the intermediate charge air coolers on each cylinder bank is positioned longitudinally with respect to the V diesel engine between the exhaust gas return cooler arranged on the respective cylinder bank and the low-pressure compressors of the turbochargers arranged on the end face of the respective cylinder bank, and said each of the intermediate charge air coolers each is arranged such that each of the intermediate charge air cooler connectors of said each of the intermediate charge air coolers are generally perpendicular to an engine longitudinal axis of the V diesel engine;
   wherein said each of the intermediate charge air cooler connectors is arranged in an end face of said each of the respective intermediate charge air coolers;
   wherein the primary charge air cooler is arranged between the exhaust gas return coolers;
   wherein said primary charge air cooler is arranged above a cylinder head of each cylinder bank; and
   wherein a charge air inlet and outlet of the primary charge air cooler are arranged in the direction of the engine longitudinal axis such that the main charge air cooler is configured to flow away from the primary output member.

2. The V diesel engine according to claim 1, wherein the high-pressure exhaust stream turbocharger has a high-pressure compressor;
   wherein one of the low-pressure compressors is arranged in each of the first and second low-pressure exhaust stream turbochargers;
   wherein each of the first and second low-pressure compressors, the intermediate charge air cooler, and the high pressure compressor directs a charge air stream in the direction of flow;
   wherein said each of the first and second low-pressure compressors, the intermediate charge air coolers are disposed in series in a first and a second charge air line;
   wherein the first and the second charge air lines are merged at the primary charge air cooler into a single charge air stream;
   wherein the single charge air stream is divided between the first and the second cylinder banks downstream of the primary charge air cooler; and
   wherein said each of the exhaust gas return systems has the exhaust gas return cooler per cylinder bank, to cool the exhaust gas being introduced into the charge air stream flowing to the respective cylinder bank, downstream of the primary charge air cooler.

3. The V diesel engine according to claim 1, wherein said primary charge air cooler is arranged between the flanks of the V-shape of the V diesel engine.

4. The V diesel engine according to claim 1, wherein exhaust gas from the respective first and second cylinder banks is introduced into a charge air stream downstream of the primary charge air cooler by a mixer element.

5. The V diesel engine according to claim 4, wherein the mixer element is arranged on an end face of the primary charge air cooler, wherein said end face faces away from the primary output element.

6. The V diesel engine according to claim 1, wherein at least one of said each of the exhaust gas return coolers, the high-pressure exhaust stream turbocharger, said each of the low-pressure exhaust stream turbochargers, the primary charge air cooler, and said each of the intermediate charge air coolers are arranged symmetrically about a center axis of the V diesel engine.

7. The V diesel engine according to claim 1, wherein the first and second low-pressure exhaust stream turbochargers further comprises a first low pressure turbine and a second low pressure turbine; and the high-pressure exhaust stream turbocharger further comprises a high pressure turbine;
   wherein the first low pressure turbine, the second low pressure turbine, and the high pressure turbine are arranged on an output side of the V engine.

8. The V diesel engine according to claim 1, wherein on each cylinder bank, one low-pressure exhaust stream turbocharger is connected in series to one high-pressure exhaust stream turbocharger.

9. The V diesel engine according to claim 1, wherein a ratio of an engine length of the V diesel engine to a block length of the V diesel engine is smaller than 1.4.

* * * * *